US011257130B2

(12) United States Patent
Sengupta et al.

(10) Patent No.: US 11,257,130 B2
(45) Date of Patent: Feb. 22, 2022

(54) METHOD AND SYSTEM FOR REVIEW VERIFICATION AND TRUSTWORTHINESS SCORING VIA BLOCKCHAIN

(71) Applicant: Mastercard International Incorporated, Purchase, NY (US)

(72) Inventors: Shuvam Sengupta, Haryana (IN); Ankur Arora, New Delhi (IN); Navneet Kumar, Bihar (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 291 days.

(21) Appl. No.: 15/682,973

(22) Filed: Aug. 22, 2017

(65) Prior Publication Data

US 2019/0066119 A1 Feb. 28, 2019

(51) Int. Cl.
*G06Q 30/02* (2012.01)
*H04L 9/32* (2006.01)
(Continued)

(52) U.S. Cl.
CPC ......... *G06Q 30/0282* (2013.01); *G06F 21/64* (2013.01); *G06Q 20/4016* (2013.01);
(Continued)

(58) Field of Classification Search
CPC ............. G06Q 30/018; G06Q 20/4016; G06Q 30/0282; G06Q 2220/00; G06F 21/64;
(Continued)

(56) References Cited

U.S. PATENT DOCUMENTS 7,433,832 B1 * 10/2008 Bezos .................... G06Q 10/10
705/26.8
8,108,255 B1 * 1/2012 Robinson ............... G06Q 30/02
705/14.44
(Continued)

FOREIGN PATENT DOCUMENTS

CN        106097073 A     11/2016
CN        106878396 A      6/2017
(Continued)

OTHER PUBLICATIONS

Zheng, Z., et al. (Jun. 2017). An overview of blockchain technology: Architecture, consensus, and future trends. In 2017 IEEE International Congress on Big Data (BigData Congress) (pp. 557-564). IEEE. (Year: 2017).*

(Continued)

*Primary Examiner* — Jerry O'Connor
*Assistant Examiner* — Thomas Yih Ho
(74) *Attorney, Agent, or Firm* — Buchanan Ingersoll & Rooney PC

(57) ABSTRACT

A method for immutability of review verifications includes: storing a blockchain; receiving a review submission from a reviewer about an entity comprising feedback; identifying a review identifier unique to the review submission; generating a new review block for the blockchain including the review submission including the review identifier; receiving verification submissions from other reviewers about the review submission indicating positive or negative verification of the review submission; generating verification blocks for the blockchain that include the verification submissions; adding a trustworthiness block to the blockchain for the review once enough positive verifications are received; and adding a trustworthiness block to the blockchain for the reviewer once they have enough trustworthy reviews.

14 Claims, 6 Drawing Sheets

(51) Int. Cl.
  *G06Q 30/00* (2012.01)
  *G06F 21/64* (2013.01)
  *G06Q 20/40* (2012.01)
(52) U.S. Cl.
  CPC ......... *G06Q 30/018* (2013.01); *H04L 9/3239* (2013.01); *H04L 9/3297* (2013.01); *G06F 2221/2151* (2013.01); *G06Q 2220/00* (2013.01); *H04L 2209/38* (2013.01)
(58) Field of Classification Search
  CPC ........... G06F 2221/2151; H04L 9/3239; H04L 9/3297; H04L 2209/38
  USPC ........................................................ 705/7.11
  See application file for complete search history.

(56) References Cited

U.S. PATENT DOCUMENTS

| | | | | |
|---|---|---|---|---|
| 8,140,380 | B2* | 3/2012 | Keller | G06Q 10/06393 |
| | | | | 705/7.32 |
| 8,321,496 | B2* | 11/2012 | Wilson | G06F 3/0482 |
| | | | | 707/722 |
| 8,554,601 | B1* | 10/2013 | Marsh | G06Q 30/0278 |
| | | | | 705/7.32 |
| 10,248,712 | B1* | 4/2019 | Cheng | G06F 16/285 |
| 2008/0120166 | A1* | 5/2008 | Fernandez | G06Q 30/02 |
| | | | | 702/179 |
| 2013/0066885 | A1* | 3/2013 | Komuves | G06Q 10/10 |
| | | | | 707/748 |
| 2013/0253940 | A1* | 9/2013 | Zziwa | G06Q 50/22 |
| | | | | 705/2 |
| 2015/0302400 | A1* | 10/2015 | Metral | G06Q 20/382 |
| | | | | 705/75 |
| 2016/0098723 | A1 | 4/2016 | Feeney | |
| 2016/0300274 | A1* | 10/2016 | Dolen | G06Q 30/0282 |
| 2017/0054611 | A1* | 2/2017 | Tiell | G06F 16/285 |
| 2017/0061300 | A1* | 3/2017 | Yahia | G06N 5/022 |
| 2017/0103472 | A1* | 4/2017 | Shah | G06N 5/02 |
| 2017/0109838 | A1* | 4/2017 | Byron | G06F 16/23 |
| 2017/0140394 | A1* | 5/2017 | Cao | G06Q 30/0201 |
| 2017/0364825 | A1* | 12/2017 | Tiell | G06Q 10/0635 |
| 2018/0114261 | A1* | 4/2018 | Jayachandran | G06Q 30/00 |
| 2018/0349968 | A1* | 12/2018 | O'Brien | H04L 67/1097 |
| 2018/0357683 | A1* | 12/2018 | Pickover | G06N 20/00 |

FOREIGN PATENT DOCUMENTS

| | | | | |
|---|---|---|---|---|
| CN | 106897902 A | | 6/2017 | |
| KR | 20160127818 A | * | 11/2016 | ........... G06F 16/951 |
| WO | WO-2019025913 A1 | * | 2/2019 | ........... H04L 9/3239 |

OTHER PUBLICATIONS

Vyshegorodtsev, M., et al. (Mar. 2013). Reputation scoring system using an economic trust model: . . . In 2013 27th International Conference on Advanced Information Networking and Applications Workshops (pp. 730-737). IEEE. (Year: 2013).*

Gipp, B., et al. (Jun. 2017). Cryptsubmit: introducing securely timestamped manuscript submission and peer review feedback using the blockchain. In Proceedings of the 17th ACM/IEEE Joint Conference on Digital Libraries (pp. 273-276). IEEE Press. (Year: 2017).*

Schaub, A., et al. (May 2016). A trustless privacy-preserving reputation system. In IFIP International Conference on ICT Systems Security and Privacy Protection (pp. 398-411). Springer, Cham. (Year: 2016).*

Yasin, A., et al. (Jun. 2016). An online identity and smart contract management system. In 2016 IEEE 40th Annual Computer Software and Applications Conference (COMPSAC)(vol. 2, pp. 192-198). IEEE. (Year: 2016).*

Dennis, R., & Owenson, G. (2016). Rep on the roll: a peer to peer reputation system based on a rolling blockchain. International Journal for Digital Society, 7(1), 1123-1134. (Year: 2016).*

Dennis, R., et al. (Dec. 2015). Rep on the block: A next generation reputation system based on the blockchain. In 2015 10th International Conference for Internet Technology and Secured Transactions (ICITST) (pp. 131-138). IEEE. (Year: 2015).*

Carboni, D. (2015). Feedback based reputation on top of the bitcoin blockchain. arXiv preprint arXiv:1502.01504. (Year: 2015).*

Cai, Y., & Zhu, D. (2016). Fraud detections for online businesses: a perspective from blockchain technology. Financial Innovation, 2(1), 20. (Year: 2016).*

Schaub et al., "A Trustless Privacy-Preserving Reputation System", International Association for Cryptologic Research, Jan. 7, 2016, pp. 1-25.

Soska et a., "Beaver: A Decentralized Anonymous Marketplace with Secure Reputation", International Association for Cryptologic Research, Aug. 21, 2016, pp. 1-15.

International Search Report and Written Opinion of the International Searching Authority (Forms PCT/ISA/210 and PCT/ISA/237) dated Oct. 9, 2018, by the European Patent Office in corresponding International Application No. PCT/US2018/044478. (13 page).

Office Action (First Office Action) dated Nov. 2, 2020, by the State Intellectual Property Office of People's Republic of China in corresponding Chinese Patent Application No. 201810957168.X and an English Translation of the Office Action. (12 pages).

* cited by examiner

METHOD AND SYSTEM FOR REVIEW VERIFICATION AND TRUSTWORTHINESS SCORING VIA BLOCKCHAIN

FIELD

The present disclosure relates to the verification and immutability of reviews for trustworthiness scoring via blockchain, and more specifically to the use of a blockchain to store review data, positive and negative verifications of reviews, and the trustworthiness scoring of individual reviews and reviewers.

BACKGROUND

When consumers are interested in trying a new service, such as a restaurant, hotel, entertainment venue, utility, service provider, mechanic, etc., often times the consumer will seek reviews to help guide them in their decision. Traditionally, consumers could ask friends and neighbors for their reviews. With the rise of the Internet and increased accessibility to web pages and mobile applications, a vast number of websites and application programs have gained prominence as a platform to collect and aggregate consumer reviews of services. A consumer interested in a new service may utilize such a tool to view reviews of a particular product or service they are interested in, or to identify a product or service in a given area based on overall consumer reviews for each of the products or services in that area.

However, while a plethora of services may be available to consumers, all existing services utilize private processes for the submission and curating of reviews. As a result, the reliability of such services can often be questioned by consumers, as bad reviews may disappear for some entities or be given greater weight in others. In some cases, services have even been found to be soliciting payment in exchange for hiding or obscuring bad reviews and for making favorable reviews more prominent. Due to the lack of transparency in the submission and curating processes, consumers often question the trustworthiness of the reviews for a given service, negating the main purpose of such tools. While this can be combated through legal action when these practices are exposed, there is presently no known technology based way to verify the review as being trustworthy. Some closed loop services, such as currently offered by Amazon® can confirm if a person actually purchased a product when providing a review, but does not prevent people avoidance of these mechanisms and works for only a limited population of products and users.

Thus, there is a need for a technological solution for reviews of a service and verification thereof to determine trustworthiness of reviews and reviewers in a manner that is transparent and resistant, if not immune, to tampering.

SUMMARY

The present disclosure provides a description of systems and methods for the immutability of review verifications. A blockchain is used to store reviews of entities in addition to user verifications of such reviews, indicating if a review is accurate or inaccurate. The blockchain is publicly available and, by the storage mechanisms of the blocks, immutable, resulting in an index of reviews that are immune to tampering, and other nefarious actions. The inclusion of verifications for reviews, also stored in the blockchain, provides for resistance against astroturfing (i.e., the practice of masking the originators of a message to make it appear as though it originates from and is supported by grassroots participants) and other indirect methods of adversely influencing reviews. To make the data easier to follow for consumers, regular blocks are added to the blockchain to indicate when a particular review or reviewer is considered trustworthy, using criteria that can be independently validated and audited by any third party due to the publicly available nature of the blockchain.

A method for immutability of review verifications includes: storing, in a memory of a processing server, a blockchain comprised of one or more blocks, wherein each block includes at least a block header and one or more data values, the block header comprising at least a timestamp, a block reference value, and a data reference value; receiving, by a receiving device of the processing server, a review submission, wherein the review submission includes at least a reviewer identifier, entity identifier, and review data comprising feedback associated with an entity corresponding to the entity identifier; identifying, by an identification module of the processing server, a review identifier unique to the received review submission; generating, by a generation module of the processing server, a new review block comprising at least a block header and one or more data values, wherein the one or more data values includes the review submission, the review submission further includes the identified review identifier, and the block header includes at least a timestamp, a data reference value corresponding to the one or more data values, and a block reference value corresponding to a block most recently added to the blockchain based on the timestamp included in the block header of each of the one or more blocks; receiving, by the receiving device of the processing server, one or more verification submissions, wherein each verification submission includes at least a different reviewer identifier, the review identifier, and verification data indicating positive or negative verification of the review submission; and generating, by the generation module of the processing server, one or more verification blocks, each verification block comprising at least a block header and one or more data values, wherein each of the verification submissions are included in the one or more data values included in one of the one or more verification blocks, and the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block.

A system for immutability of review verifications includes: a memory of a processing server configured to store a blockchain comprised of one or more blocks, wherein each block includes at least a block header and one or more data values, the block header comprising at least a timestamp, a block reference value, and a data reference value; a receiving device of the processing server configured to receive a review submission, wherein the review submission includes at least a reviewer identifier, entity identifier, and review data comprising feedback associated with an entity corresponding to the entity identifier; an identification module of the processing server configured to identify a review identifier unique to the received review submission; and a generation module of the processing server configured to generate a new review block comprising at least a block header and one or more data values, wherein the one or more data values includes the review submission, the review submission further includes the identified review identifier, and the block header includes at least a timestamp, a data reference value corresponding to the one or more data values, and a block reference value corresponding to a block most recently added to the blockchain based on the timestamp included in the block header of each of the one or more blocks, wherein the receiving device of the processing server is further configured to receive one or more verification submissions, wherein each verification submission includes at least a different reviewer identifier, the review identifier, and verification data indicating positive or negative verification of the review submission; and the generation module of the processing server is further configured to generate one or more verification blocks, each verification block comprising at least a block header and one or more data values, wherein each of the verification submissions are included in the one or more data values included in one of the one or more verification blocks, and the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for the Trustworthiness Scoring of Reviews

Figure 1:
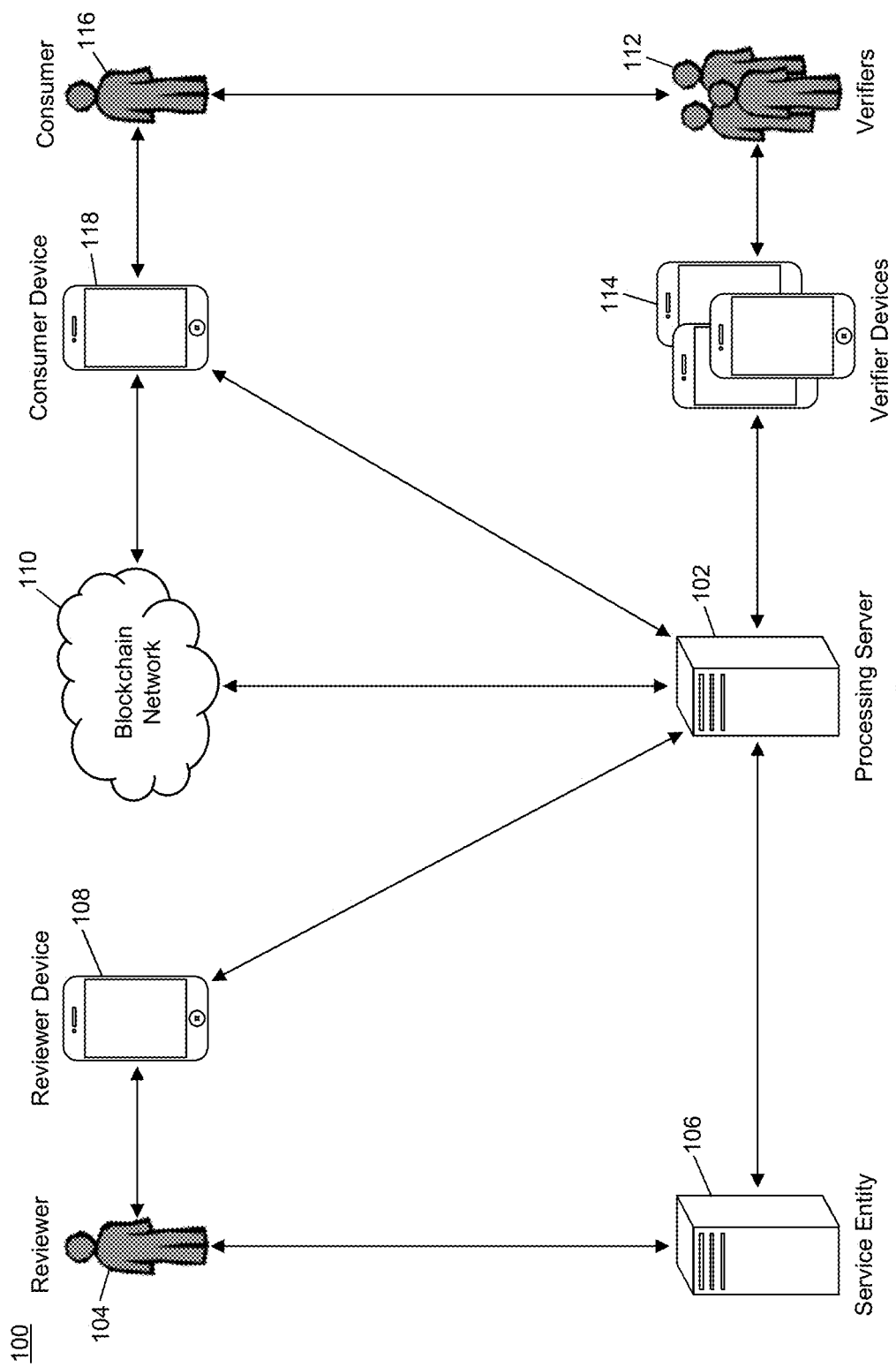
FIG. 1 is a block diagram illustrating a high level system architecture for the trustworthiness scoring of reviews and verifications via blockchain in accordance with exemplary embodiments.

FIG. 1 illustrates a system 100 for the trustworthiness scoring of entity and service reviews based on verifications and review data stored via a blockchain.

The system 100 may include a processing server 102. The processing server 102, discussed in more detail below, may be configured to operate as a node in a blockchain network 110 associated with a blockchain, and, as part of the operation as a node, may be configured to generate and confirm blocks for addition to the blockchain that include user reviews of a service entity 106, verifications of user reviews, and indications of trustworthiness for reviews and reviewers. The blockchain network 110 may be comprised of a plurality of nodes, each of which may be configured to perform the functions of the processing server 102 as discussed herein. The blockchain network 110 may be configured such that the blockchain is stored in each of the plurality of nodes and publicly accessible by any third party entity or service to review blockchain data, and such that the blockchain network 110 may continue to be in operation even in cases of interruption of one or more nodes.

In the system 100, a reviewer 104 may wish to review a service entity 106. The service entity 106 may be a service provider, such as a restaurant, plumber, HVAC repair, entertainment venue, etc., or, in some cases, may be a specific product or manufacturer, or any other entity or item that may be reviewed by a reviewer 104 for which other individuals or entities may be interested in. For instance, in some embodiments, the service entity 106 may be replaced by a consumer product. The reviewer 104 may submit their review of the service entity 106 to the processing server 102. The review may be submitted via a reviewer device 108, which may be a computing device that is configured to communicate with the processing server 102 using any suitable communication network and method, such as via a web page, application program, application programming interface, short messaging service, multimedia messaging service, e-mail, telephone, etc. The reviewer device 108 may be, for instance, a desktop computer, laptop computer, notebook computer, tablet computer, cellular phone, smart phone, smart watch, smart television, wearable computing device, implantable computing device, etc.

The reviewer 104 may submit the review to the processing server 102 via the reviewer device 108, where the review may include at least an entity identifier associated with the service entity 106 in addition to feedback (e.g., their review) associated with the service entity 106. The entity identifier may be a unique value associated with the service entity 106 for use by the processing server 102 in identifying the service entity 106 and data (e.g., reviews, verifications, communications, etc.) associated therewith, such as an identification number, tax identification number, username, e-mail address, routing number, etc. The feedback may include any data that may be suitable for use as a review, such as a score, rating, description, time and/or date, one or more images, one or more videos, reviewer information, proof of access of a service or ownership, etc.

Upon receipt of the review, the processing server 102 may generate or otherwise identify a reviewer identifier to be associated with the reviewer 104. The reviewer identifier may be a unique value that is associated with the reviewer 104 and uniquely associated with all reviews submitted by the reviewer 104. In instances where the reviewer 104 had been previously assigned a reviewer identifier, the submitted review may include the reviewer's review identifier. The reviewer identifier may be any suitable type of value, such as an identification number, username, e-mail address, private key (e.g., used to generate a digital signature that can be verified by the processing server 102 to authenticate the reviewer 104), etc. The processing server 102 may also generate or otherwise identify a review identifier to the review itself, which may be a unique value that is uniquely associated with the specific review for identification of the review and other data related thereto (e.g., verifications, as discussed below).

Once the review has been received and associated with a review identifier, the processing server 102 may include the review and review identifier in a new block that is to be confirmed and added to the blockchain. The blockchain may be comprised of a plurality of blocks, where each block includes at least a block header and one or more data values. The block header for a given block may be comprised of at least a timestamp, a block reference value, and a data reference value. The timestamp may be representative of the time at which the respective block was generated. The block reference value may be a value that refers to the block most recently added to the blockchain prior to the respective block, such as may be determined via timestamp. In exemplary embodiments, the block reference value may refer to the block header of the prior block. The data reference value may be a value that refers to the one or more data values stored in the respective block. In an exemplary embodiment, the block reference value and data reference value may be hash values, generated via the application of one or more hashing algorithms to the respective data. The use of hash values may contribute to the immutability of the blockchain, as the tampering with any data value in the blockchain would require modification of the corresponding block's block header, which in turn would require modification of the block header in every subsequent block in the blockchain, which would have to be modified in every copy of the blockchain that is stored among all of the nodes comprising the blockchain network 110.

The one or more data values stored in each block may include review submissions, such as the review submitted by the reviewer 104 to the processing server 102, as well as verifications and trustworthiness determinations, discussed in more detail below. Upon receipt of the reviewer's review and identification of the review identifier, the processing server 102 may include a review data value in a new block that includes the review and review identifier, and may electronically transmit the block to one or more other nodes comprising the blockchain network 110. The nodes may confirm the block using methods and systems suitable therefor, including the verification of the generated reference values to ensure immutability of the blockchain, such as via proof of work. Once the block is confirmed, the block may be added to the blockchain and distributed to all of the nodes comprising the blockchain network 110, and may be publicly accessible to any interested party.

The review provided by the reviewer 104 may be available for viewing by a plurality of verifiers 112. Verifiers 112 may be individuals or other entities that may confirm or refute the authenticity or accuracy of the review. For instance, a verifier 112 may be a companion of the reviewer 104 that used the service entity 106 with the reviewer 104 and can attest to the accuracy of the review, or another customer of the service entity 106 that agrees with the reviewer's review. In another example, the verifier 112 may be the service entity 106 or another party that believes that the reviewer 104 may not be genuine or accurate in their review, such as in instances where the reviewer 104 may be a competitor seeking to disrupt the service entity's business. A verifier 112 may, using a verifier device 114 (e.g., another computing device, similar to the reviewer device 108), submit a verification to the processing server 102. The verification may include at least the review identifier associated with the review to which the verification corresponds and their verification of the review (e.g., indicating positive of negative verification of the review, such as may confirm or refute the reviewer's review of the service entity 106). The verification may also include a reviewer identifier associated with the verifier 112, which may be identified by the processing server 102 or, if previously provided to the verifier 112, submitted in the verification by the verifier 112. In cases where the review identifier is newly assigned, the processing server 102 may respond to the submission with the review identifier for future use by the verifier 112.

The processing server 102 may include the verification of the review in a new block that is confirmed and added to the blockchain. The verification may be included in a new data value that includes the verification, review identifier, and reviewer identifier that is included in the new block and thus publicly available to all interested parties once confirmed and added to the blockchain. The processing server 102 may continue to receive verifications for the reviewer's review from a plurality of different verifiers 112, submitted using respective verifier devices 114.

In the system 100, a consumer 116 may be interested in the service entity 106 and may want to check out reviews associated therewith. The consumer 116 may, using a consumer device 118 (e.g., a computing device, similar to the reviewer device 108 and verifier devices 114), access the blockchain as made available via the processing server 102 or other nodes in the blockchain network 110. In some embodiments, the processing server 102, other node in the blockchain network 110, or a third party entity may provide an interface for reviewing the data values stored in the blockchain to assist the consumer 116 in identifying reviews and trustworthiness, with the raw blockchain data being available for transparency and to enable consumers 116 to verify the accuracy of the data as presented. The consumer 116 may identify all reviews stored in the blockchain that include the entity identifier associated with the service entity 106 for whom they want to see reviews. The consumer 116 may then identify verifications for each of the identified reviews, using the associated review identifiers, to identify which reviews may be more trustworthy than others (e.g., based on the overall number of positive verifications, ratio of positive to negative verifications, etc.). The consumer 116 may thus view an accurate representation of the service entity 106 with an assurance that the data has not been tampered with or unfairly influenced due to the public availability of every review and verification and immutability of the blockchain.

In some embodiments, the processing server 102 may be further configured to assist consumers 116 by providing indications of trustworthiness for reviews and reviewers 104. In such embodiments, the processing server 102 may identify a threshold number of verifications that may be received for any specific review to consider that review to be trustworthy. In some cases, a review may only be considered trustworthy if the number of positive verifications reaches the threshold, or if the ratio of positive verifications to negative verifications is above a separate threshold once the threshold number of verifications has been received. In some instances, the processing server 102 may utilize another threshold to indicate when a review is not trustworthy, such as upon the receipt of a threshold number of negative verifications.

Once a threshold for a review has been met, the processing server 102 may generate a new data value for the review, referred to herein as a trustworthiness data value, which may be added to a new block that is confirmed and added to the blockchain. The trustworthiness data value may include at least the review identifier associated with the corresponding review, and may also include an indication that the review may be trusted (e.g., or not trusted, as applicable) for meeting the criteria. In some cases, the data value may include the criteria (e.g., that the review has received the threshold number of positive verifications). The consumer 116 may thus be able to see if any of the reviews for the service entity 106 are considered to be particularly trustworthy (or not, as the case may be), and may evaluate the service entity 106 accordingly.

The processing server 102 may also be configured to provide the same trustworthiness indications for reviewers 104. In such cases, when a review submitted by a reviewer 104 (e.g., identified via their associated reviewer identifier) is determined as being trustworthy, the processing server 102 may identify if the number of trusted reviews submitted by the reviewer 104 has reached a predetermined threshold. Once the reviewer 104 has submitted the sufficient number of trusted reviews, they may be considered a trusted reviewer, with a trustworthiness data value being generated and added to a new block confirmed and added to the blockchain for the reviewer 104, that includes the reviewer's reviewer identifier and the indication that the reviewer 104 is trusted. In some cases, the criteria (e.g., threshold number of trusted reviews) may also be included in the trustworthiness data value. The consumer 106 may thus be able to see if any of the reviews for the service entity 106 are from a trusted reviewer 104, and see if that trusted reviewer's review itself is also trusted.

In some embodiments, the processing server 102 may be further configured to provide review scores to consumers 116 for reviews, reviewers 104, and service entities 106. The consumer 116 may submit a request to the processing server 102 via their consumer device 118 using a suitable communication network and method that may identify a review, reviewer 104, or service entity 106, or a combination thereof, for which a score is requested. For example, the consumer 116 may want a score for a specific service entity 106. The processing server 102 may then identify a score based on the reviews submitted for the service entity 106, identified using the associated entity identifier. In some cases, the processing server 102 may identify different scores based on the trustworthiness of the reviews and/or reviewers 104. For instance, the processing server 102 may evaluate all reviews to identify an overall score for the service entity 106 (e.g., based on scores included in each of the reviews), may identify a score for the service entity 106 based on only trusted reviews, may identify a score for the service entity 106 based on only reviews submitted by trusted reviewers 104, and/or may identify a score for the service entity 106 based on only trusted reviews submitted by trusted reviewers 104. The scores may be provided to the consumer 116, which may be able to see the overall rating for the service entity 106, but also the rating when only considering trusted reviews and/or reviewers 104 (e.g., to mitigate effects of attempted astroturfing or other improper influencing of reviews).

The methods and systems discussed herein provide a more technologically advanced system for aggregating and presenting user reviews of services to consumers 116 that are more trustworthy due to the transparency in the submission, storage, and verification of reviews via the use of a blockchain, where all submissions and data associated therewith are immutability and where all trustworthiness determinations can be independently verified by any interested party. Due to the immutability of the storage of reviews, once a review is submitted it cannot be tampered with or removed, preventing problems that exist with current review aggregation services.

Processing Server

Figure 2:
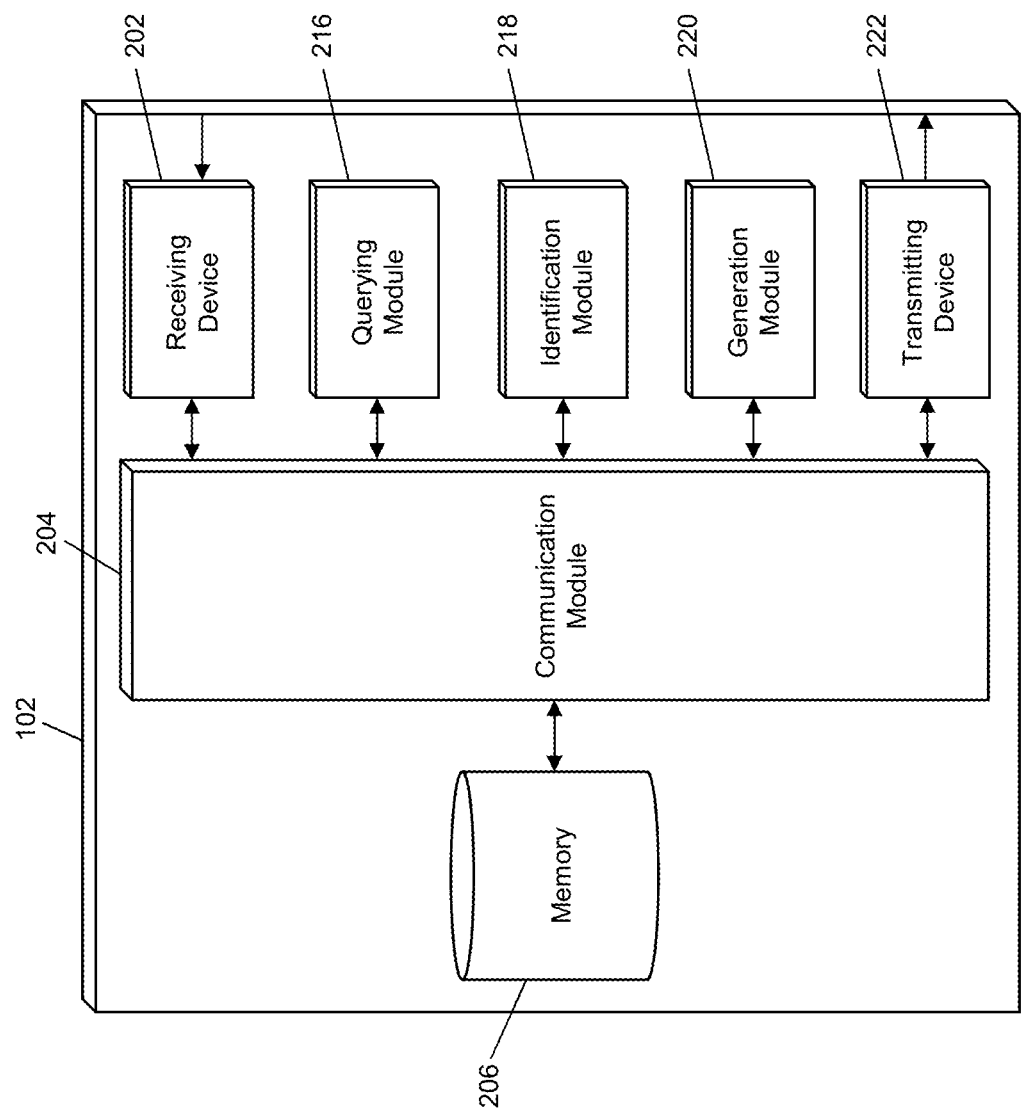
FIG. 2 is a block diagram illustrating the processing server of the system of FIG. 1 for the trustworthiness scoring of reviews and verifications via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from service entities 106, reviewer devices 108, verifier devices 114, consumer devices 118, and other nodes comprising the blockchain network 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet.

The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by reviewer devices 108 that are superimposed or otherwise encoded with reviews of service entities 106, which may include an entity identifier associated therewith and a review, and may also include a reviewer identifier associated with the submitting reviewer 104. The receiving device 202 may also be configured to receive data signals electronically transmitted by verifier devices 114 that are superimposed or otherwise encoded with verifications of reviews, which may include a review identifier associated with the review that is being verified and an indication of a positive or negative verification of the review, and may also include a reviewer identifier associated with the submitting verifier 112. The receiving device 202 may be further configured to receive data signals that are superimposed or otherwise encoded with requests for blockchain data, which may be electronically transmitted by service entities 106, consumer devices 118, or other systems. In some cases, such a request may specify a review identifier, reviewer identifier, or entity identifier for which specific data values are requested.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, identification module 218, generation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, blockchain data, hashing algorithms for generating reference values, algorithms for verifying digital signatures, databases of review, reviewer, and entity identifiers, threshold values for determining trustworthiness, program code for interfaces for accessing of blockchain data, etc.

The processing server 102 may include a querying module 216. The querying module 216 may be configured to execute queries on databases to identify information. The querying module 216 may receive one or more data values or query strings, and may execute a query string based thereon on an indicated database, such as the memory 206, to identify information stored therein. The querying module 216 may then output the identified information to an appropriate engine or module of the processing server 102 as necessary. The querying module 216 may, for example, execute a query on the memory 206 to identify verification blocks for a particular review, based on inclusion of the associated review identifier.

The processing server 102 may also include an identification module 218. The identification module 218 may be configured to identify data used in the performing of the functions of the processing server 102 as discussed herein. The identification module 218 may receive instructions as input, may identify data based on the instructions, and may output the identified data to another module or engine of the processing serve 102. For instance, the identification module 218 may be configured to identify review, reviewer, or entity identifiers for inclusion in data values stored in the blockchain, and may be configured to identify when a review or reviewer is trusted based on a number of positive verifications or trusted reviews, respectively, compared to associated thresholds (e.g., stored in the memory 206 and accessed via the querying module 216).

The processing server 102 may also include a generation module 220. The generation module 220 may be configured to generate data for use by the processing server 102 in performing the functions discussed herein. The generation module 220 may receive instructions requesting that data be generated, may generate the data, and may output the generated data to another module or engine of the processing server 102. The generation module 220 may be configured, for example, to generate new data values for storage in the blockchain, generate reference values via the application of hashing algorithms to data, generate new block headers for blocks, and generate new blocks for confirmation and addition to the blockchain.

The processing server 102 may also include a transmitting device 222. The transmitting device 222 may be configured to transmit data over one or more networks via one or more network protocols. In some instances, the transmitting device 222 may be configured to transmit data to reviewer devices 108, verifier devices 114, consumer devices 118, service entities 106, other nodes comprising the blockchain network 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals superimposed or otherwise encoded with identifiers to reviewer devices 108, service entities 106, or verifier devices 114, such as to provide identifiers identified therefor for use in future communications and submission. The transmitting device 222 may also be configured to electronically transmit data signals to other nodes comprising the blockchain network 110 that are superimposed or otherwise encoded with newly generated blocks for confirmation thereof prior to addition to the blockchain. The transmitting device 222 may be further configured to electronically transmit data signals superimposed or otherwise encoded with blockchain data, including blocks and/or data values stored therein, such as may be transmitted to consumer devices 118 or other computing devices or systems.

Process for Identifying Trusted Reviews and Reviewers Via Blockchain

Figure 3:
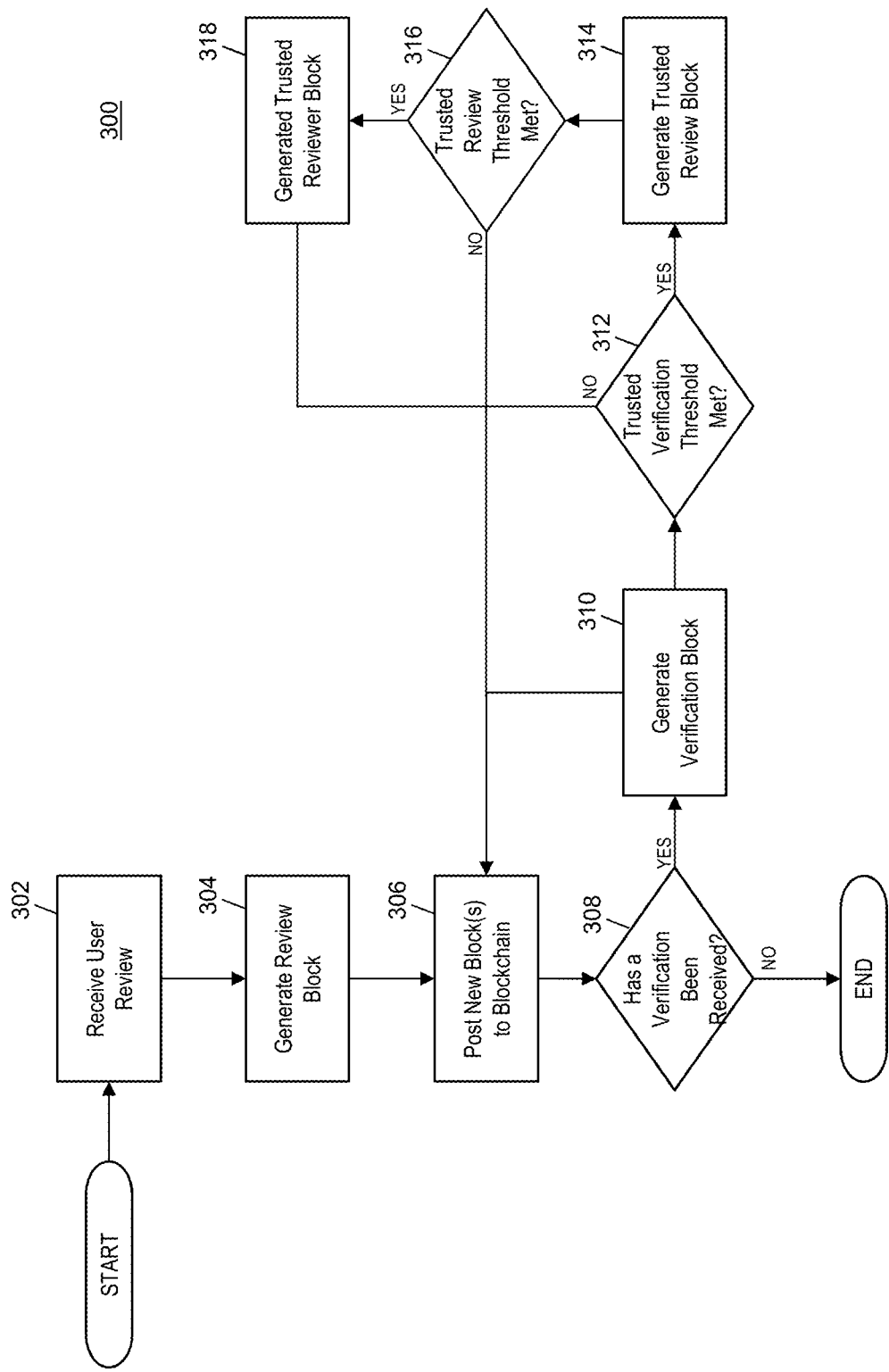
FIG. 3 is a flow diagram illustrating a process for generating review, verification, and trusted review and reviewer blocks using the processing server of FIG. 2 in accordance with exemplary embodiments.

FIG. 3 illustrates a process 300 executed by the processing server 102 of the system 100 of FIG. 1 for the receipt of submitted reviews and verifications thereof and identification of reviews and reviewers 104 as trusted based thereon, using data stored in a blockchain.

In step 302, the receiving device 202 of the processing server 102 may receive a user review submitted by a reviewer 104 via a reviewer device 108 using a suitable communication network and method. The user review may include at least an entity identifier associated with the service entity 106 to whom the review applies, a reviewer identifier associated with the reviewer 104, and the review itself. In step 304, the generation module 220 of the processing server 102 may generate a new block for addition to the blockchain that is comprised of a block header and one or more data values, including a review data value that includes the user review and a review identifier that is unique to the user review (e.g., identified via the identification module 218 of the processing server 102). The block header may include at least a timestamp, a block reference value generated (e.g., by the generation module 220) by hashing the block header of the most recent block added to the blockchain, and a data reference value generated (e.g., by the generation module 220) by hashing the one or more data values included in the respective block. In step 306, the transmitting device 222 of the processing server 102 may electronically transmit the new block to other nodes in the blockchain network 110 for the block to be confirmed and added to the blockchain and made publicly accessible.

In step 308, the receiving device 202 of the processing server 102 may await receipt of a verification submission by a verifier 112. If no submission is received, then the process 300 may end. When a verification submission is received, then, in step 310, the generation module 220 of the processing server 102 may generate a new block whose one or more data values includes a verification data value corresponding to the verification submission, which may include at least the review identifier associated with the review being verified, a reviewer identifier associated with the verifier 112 that submitted the verification, and the verification itself, which may indicate if the corresponding review is confirmed or refuted. In step 312, the identification module 218 of the processing server 102 may identify if the verification causes a number of verifications (e.g., positive verifications, if applicable) for the review to reach a predetermined threshold for trustworthiness. If the threshold is not met by the new verification, then the process 300 may proceed to step 306 where the new block including the verification data value is added to the blockchain.

If the threshold is met, then, in step 314, the generation module 220 may generate a new block, or add a new data value to the block including the verification data value if it has not yet been added to the blockchain, that includes a trusted review data value as one of the data values included therein. The trusted review data value may include at least the review identifier for the review and an indication that the review is considered a trusted review. In some cases, the trusted review data value may further include the criteria that resulted in the review being considered trusted, such as the number and/or ratio of positive verifications.

In step 316, the identification module 218 of the processing server 102 may identify if the determination that the review is trusted causes a number of trusted reviews for the associated reviewer 104 to reach a predetermined threshold for trustworthiness. If the threshold is not met by the newly trusted review, then the process 300 may proceed to step 306 where the new block(s) including the verification data value and trusted review data value is/are added to the blockchain. If the threshold is met, then, in step 318, the generation module 220 may generate a new block, or add a new data value to the block including the verification data value and/or trusted review data value if one has not yet been added to the blockchain, that includes a trusted reviewer data value as one of the data values included therein. The trusted reviewer data value may include at least the reviewer identifier for the reviewer 104 and an indication that the reviewer 104 is considered a trusted reviewer. In some cases, the trusted reviewer data value may further include the criteria that resulted in the reviewer 104 being considered trusted, such as the number of trusted reviews and review identifiers associated therewith. The process 300 may then proceed to step 306 for the addition of the new block(s) to the blockchain.

Process for Entity Scoring Based on Review and Reviewer Trustworthiness

Figure 4:
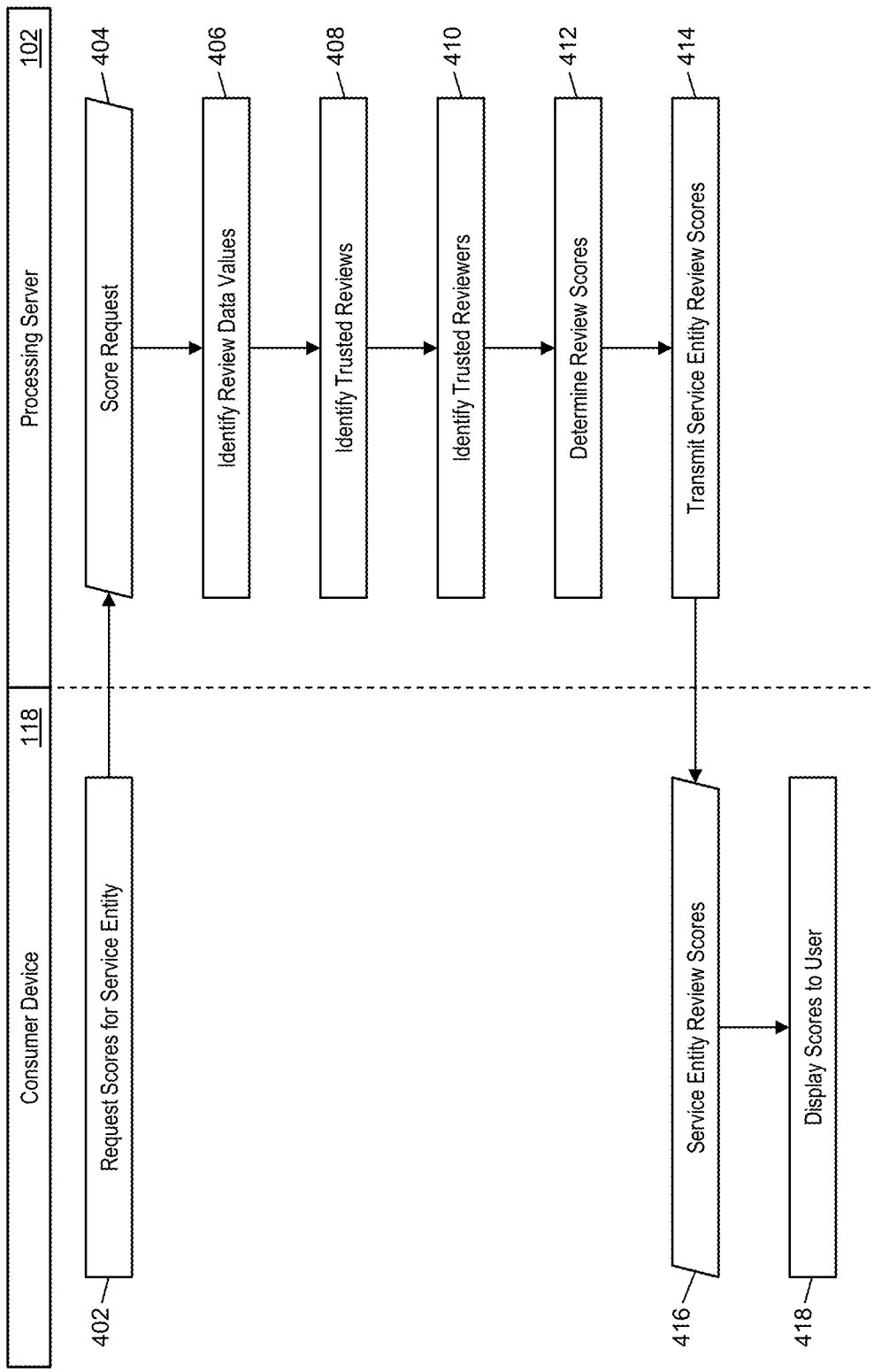
FIG. 4 is a flow diagram illustrating a process for the distribution of a review score for an entity based on trustworthiness of reviews and verifications using a blockchain in the system of FIG. 1 in accordance with exemplary embodiments.

FIG. 4 illustrates a process for the scoring of an entity based on reviews and trustworthiness of reviews and reviewers associated therewith in the system 100.

In step 402, a consumer 116 may submit, via a consumer device 118, a request for scores for a service entity 106 to the processing server 102 using a suitable communication network and method. In step 404, the receiving device 202 of the processing server 102 may receive the score request. The score request may include at least the entity identifier associated with the service entity 106. In some instances, the score request may include information identifying the service entity 106, such as an entity name, which may be used by the processing server 102 in identifying the entity identifier, such as via the querying (e.g., via the querying module 216 of the processing server 102) of a lookup table (e.g., stored in the memory 206) that stores entity information and entity identifier pairs.

In step 406, the identification module 218 of the processing server 102 may identify a plurality of review data values stored in the blockchain that are reviews of the service entity 106 based on the inclusion of the associated entity identifier therein. In step 408, the identification module 218 of the processing server 102 may identify which of the reviews of the service entity 106 are trusted reviews, based on identification of any trusted review data values stored in the blockchain that include the review identifier included in the respective review data entry. In step 410, the identification module 218 of the processing server 102 may identify which of the reviewers 104 that supplied the reviews of the service entity 106 are trusted reviewers, based on identification of any trusted reviewer data values stored in the blockchain that include the reviewer identifier included in the respective review data entry.

In step 412, the identification module 218 of the processing server 102 may identify review scores for the service entity 106. A review score may be based on the scores included in the reviews identified for the service entity 106. In some instances, the identification module 218 may identify at least one of: an overall review score based on all of the reviews, a review score for trusted review, a review score for reviews of trusted reviewers, a review score for reviews that are not yet trusted, a review score for reviews of reviewers not yet trusted, and a review score for trusted reviews from trusted reviewers. In step 414, the transmitting device 222 of the processing server 102 may electronically transmit the identified review score(s) to the consumer device 118, for receipt thereof in step 416. In step 418, the consumer device 118 may display the review score(s) and the corresponding categories to the consumer 116 for use thereby.

Exemplary Method for Immutability of Review Verifications

Figure 5:
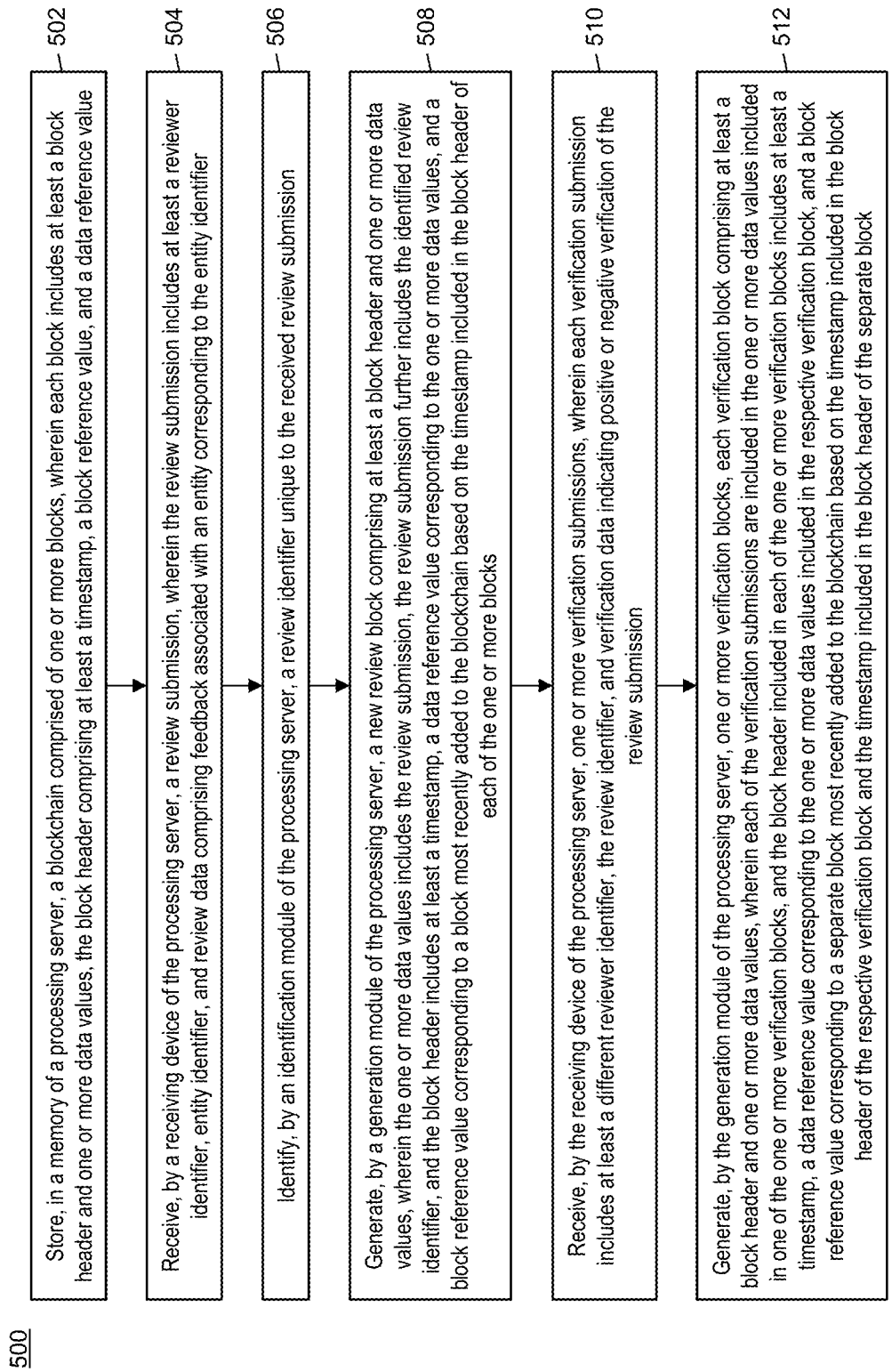
FIG. 5 is a flow chart illustrating an exemplary method for immutability of review verifications in accordance with exemplary embodiments.

FIG. 5 illustrates a method 500 for the storage and distribution of verifications of user reviews for an entity that are immutable and immune to modification or removal via the use of a blockchain.

In step 502, a blockchain comprised of one or more blocks may be stored in a memory (e.g., the memory 206) of a processing server (e.g., the processing server 102), wherein each block includes at least a block header and one or more data values, the block header comprising at least a timestamp, a block reference value, and a data reference value. In step 504, a review submission may be received by a receiving device (e.g., the receiving device 202) of the processing server, wherein the review submission includes at least a reviewer identifier, entity identifier, and review data comprising feedback associated with an entity corresponding to the entity identifier.

In step 506, a review identifier unique to the received review submission may be identified by an identification module (e.g., the identification module 218) of the processing server. In step 508, a new review block comprising at least a block header and one or more data values may be generated by a generation module (e.g., the generation module 220) of the processing server, wherein the one or more data values includes the review submission, the review submission further includes the identified review identifier, and the block header includes at least a timestamp, a data reference value corresponding to the one or more data values, and a block reference value corresponding to a block most recently added to the blockchain based on the timestamp included in the block header of each of the one or more blocks.

In step 510, one or more verification submissions may be received by the receiving device of the processing server, wherein each verification submission includes at least a different reviewer identifier, the review identifier, and verification data indicating positive or negative verification of the review submission. In step 512, one or more verification blocks may be generated by the generation module of the processing server, each verification block comprising at least a block header and one or more data values, wherein each of the verification submissions are included in the one or more data values included in one of the one or more verification blocks, and the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block.

In one embodiment, the method 500 may further include: repeating receipt of verification submissions and generation of verification blocks until a predetermined number of verification submissions are received that indicate a positive verification of the review submission or a predetermined number of verification submissions are received that indicate a negative verification of the review submission; and generating, by the generation module of the processing server, a trustworthiness block, wherein the trustworthiness block includes at least a block header and a trustworthiness data value and the trustworthiness data value includes at least the review identifier and an indication of positive or negative trustworthiness for the review submission based on if the predetermined number of verification submissions indicate a positive or negative verification of the review submission, respectively. In a further embodiment, the method 500 may even further include: receiving, by the receiving device of the processing server, a score request, wherein the score request includes at least the entity identifier, executing, by the querying module of the processing server, a query on the blockchain to identify a plurality of review submissions included in a plurality of blocks, including the new review block, that includes the entity identifier; identifying, by the identification module of the processing server, a trusted review score associated with the entity corresponding to the entity identifier based on at least the review data included in each of the plurality of review submissions for which there is a corresponding trustworthiness data value included in a trustworthiness block stored in the blockchain; identifying, by the identification module of the processing server, an untrusted review score associated with the entity corresponding to the entity identifier based on at least the review data included in each of the plurality of review submissions for which there is no corresponding trustworthiness data value included in a trustworthiness block stored in the blockchain; and electronically transmitting, by a transmitting device (e.g., the transmitting device 222) of the processing server, the identified trusted review score and untrusted review score in response to the received score request.

In another further embodiment, the method 500 may also include: executing, by a querying module of the processing server, a first query on the blockchain to identify, in the one or more blocks, a plurality of additional review submissions including the reviewer identifier; executing, by the querying module of the processing server, a second query on the blockchain to identify, in the one or more blocks, a number of trustworthiness data values corresponding to the plurality of additional review submissions based on correspondences between review identifiers included in the trustworthiness data values and review submissions; and if the number of trustworthiness data values is greater than a threshold number, generating, by the generation module of the processing server, a trusted reviewer block, wherein the trusted reviewer block includes at least a block header and a trusted reviewer data value and the trusted reviewer data value includes at least the review identifier and an indication trustworthiness for review submission submitted by the review identifier. In an even further embodiment, the method 500 may even further include: receiving, by the receiving device of the processing server, a score request, wherein the score request includes at least the entity identifier, executing, by the querying module of the processing server, a query on the blockchain to identify a plurality of review submissions included in a plurality of blocks, including the new review block, that includes the entity identifier; identifying, by the identification module of the processing server, a trusted reviewer score associated with the entity corresponding to the entity identifier based on at least the review data included in each of the plurality of review submissions that includes a reviewer identifier for which there is a corresponding trusted reviewer data value included in a trusted reviewer block stored in the blockchain; identifying, by the identification module of the processing server, an untrusted reviewer score associated with the entity corresponding to the entity identifier based on at least the review data included in each of the plurality of review submissions for which there is no corresponding trusted reviewer data value included in a trusted reviewer block stored in the blockchain; and electronically transmitting, by a transmitting device of the processing server, the identified trusted reviewer score and untrusted reviewer score in response to the received score request.

In some embodiments, the method 500 may further include: receiving, by the receiving device of the processing server, a score request, wherein the score request includes at least the entity identifier, executing, by a querying module of the processing server, a query on the blockchain to identify a plurality of review submissions included in a plurality of blocks, including the new review block, that includes the entity identifier; identifying, by the identification module of the processing server, a score associated with the entity corresponding to the entity identifier based on at least the review data included in each of the plurality of review submissions; and electronically transmitting, by a transmitting device of the processing server, the identified score in response to the received score request. In one embodiment, the method 500 may also include electronically transmitting, by a transmitting device of the processing server, the generated new review block to one or more nodes associated with the blockchain for validation. In some embodiments, generating the new review block may include: generating, by a hashing module of the processing server, the block reference value by applying one or more hashing algorithms to the block header included in the most recently added block, and generating, by the hashing module of the processing server, the data reference value by applying one or more hashing algorithms to the one or more data values.

Computer System Architecture

Figure 6:
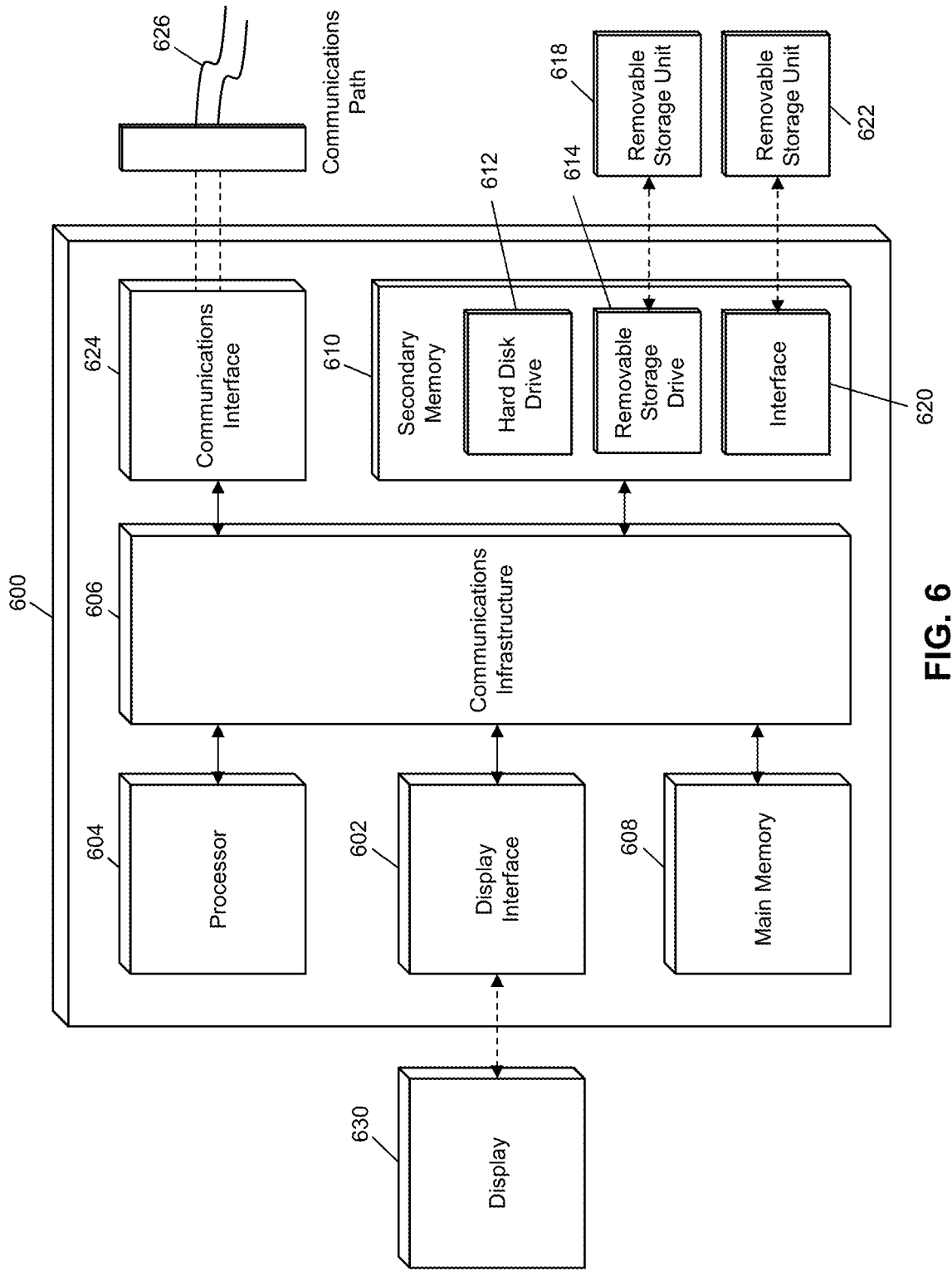
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for immutability of review verifications. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for immutability of review verifications, comprising:

storing, in a memory of a processing server, a blockchain comprised of one or more blocks, wherein each block includes at least a block header and one or more data values, the block header comprising at least a timestamp, a block reference value, and a data reference value;

receiving, by a receiver of the processing server, a review submission, wherein the review submission includes at least a reviewer identifier, entity identifier, and review data comprising feedback associated with an entity corresponding to the entity identifier;

identifying, by a processor of the processing server, a review identifier unique to the received review submission;

generating, by the processor of the processing server, a new review block comprising at least a block header and one or more data values, wherein
the one or more data values includes the review submission,
the review submission further includes the identified review identifier, and
the block header includes at least a timestamp, a data reference value corresponding to the one or more data values, and a block reference value corresponding to a block most recently added to the blockchain based on the timestamp included in the block header of each of the one or more blocks;
receiving, by the receiver of the processing server, one or more verification submissions, wherein each verification submission includes at least a unique reviewer identifier, the review identifier, and verification data indicating positive or negative verification of the review submission;
generating, by the processor of the processing server, one or more verification blocks, each verification block comprising at least a block header and one or more data values, wherein
each of the verification submissions are included in the one or more data values included in one of the one or more verification blocks, and
the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block;
determining, by the processor of the processing server, trustworthiness of the review submission by determining that a predetermined number of data values included in the one or more verification blocks indicate a positive verification of the review submission;
generating, by the processor of the processing server, a trustworthiness block, wherein the trustworthiness block includes at least a block header and a trustworthiness data value and the trustworthiness data value includes at least the review identifier and an indication of positive or negative trustworthiness for the review submission based on trustworthiness criteria including if the predetermined number of verification submissions indicate a positive or negative verification of the review submission, respectively, wherein the generated trustworthiness block further identifies to a blockchain network associated with the blockchain the trustworthiness criteria used to determine the trustworthiness of the review submission;
determining, by the processor of the processing server, whether the reviewer identifier identifies a trusted reviewer based on a trusted reviewer criteria including that a number of trustworthiness data values included in the one or more blocks corresponding to a review submission in the one or more blocks that includes the reviewer identifier with a positive verification of the review submission, exceeds a threshold number associated with the trusted reviewer criteria; and
generating, by the processor of the processing server, a trusted reviewer block, wherein the trusted reviewer block includes at least a block header and a trusted reviewer data value and the trusted reviewer data value includes at least the review identifier and an indication of trustworthiness for the review submission submitted by a reviewer associated with the review identifier, wherein the generated trusted reviewer block further identifies to the blockchain network associated with the blockchain, the trusted reviewer criteria used to determine whether the reviewer identifier is a trusted reviewer.

2. The method of claim 1, further comprising:
receiving, by the receiver of the processing server, a score request, wherein the score request includes at least the entity identifier,
executing, by the processor of the processing server, a query on the blockchain to identify a plurality of review submissions included in a plurality of blocks, including the new review block, that includes the entity identifier;
identifying, by the processor the processing server, a score associated with the entity corresponding to the entity identifier based on at least the review data included in each of the plurality of review submissions; and
electronically transmitting, by a transmitter of the processing server, the identified score in response to the received score request.

3. The method of claim 1, further comprising:
receiving, by the receiver of the processing server, a score request, wherein the score request includes at least the entity identifier,
executing, by the processor of the processing server, a query on the blockchain to identify a plurality of review submissions included in a plurality of blocks, including the new review block, that includes the entity identifier;
identifying, by the processor of the processing server, a trusted review score associated with the entity corresponding to the entity identifier based on at least the review data included in each of the plurality of review submissions for which there is a corresponding trustworthiness data value included in a trustworthiness block stored in the blockchain;
identifying, by the processor of the processing server, an untrusted review score associated with the entity corresponding to the entity identifier based on at least the review data included in each of the plurality of review submissions for which there is no corresponding trustworthiness data value included in a trustworthiness block stored in the blockchain; and
electronically transmitting, by a transmitter of the processing server, the identified trusted review score and untrusted review score in response to the received score request.

4. The method of claim 1, further comprising:
receiving, by the receiver of the processing server, a score request, wherein the score request includes at least the entity identifier,
executing, by the processor of the processing server, a query on the blockchain to identify a plurality of review submissions included in a plurality of blocks, including the new review block, that includes the entity identifier;
identifying, by the processor of the processing server, a trusted reviewer score associated with the entity corresponding to the entity identifier based on at least the review data included in each of the plurality of review submissions that includes a reviewer identifier for which there is a corresponding trusted reviewer data value included in a trusted reviewer block stored in the blockchain;

identifying, by the processor of the processing server, an untrusted reviewer score associated with the entity corresponding to the entity identifier based on at least the review data included in each of the plurality of review submissions for which there is no corresponding trusted reviewer data value included in a trusted reviewer block stored in the blockchain; and electronically transmitting, by a transmitter of the processing server, the identified trusted reviewer score and untrusted reviewer score in response to the received score request.

5. The method of claim 1, further comprising:

electronically transmitting, by a transmitter of the processing server, the generated new review block to one or more nodes associated with the blockchain for validation.

6. The method of claim 1, wherein generating the new review block includes:

generating, by the processor of the processing server, the block reference value by applying one or more hashing algorithms to the block header included in the most recently added block, and generating, by the processor of the processing server, the data reference value by applying one or more hashing algorithms to the one or more data values.

7. A system for immutability of review verifications, comprising:

a memory of a processing server storing a blockchain comprised of one or more blocks, wherein each block includes at least a block header and one or more data values, the block header comprising at least a timestamp, a block reference value, and a data reference value; and a processor of the processing server, where the processor receives a review submission, wherein the review submission includes at least a reviewer identifier, entity identifier, and review data comprising feedback associated with an entity corresponding to the entity identifier;

identifies a review identifier unique to the received review submission; and generates a new review block comprising at least a block header and one or more data values, wherein the one or more data values includes the review submission, the review submission further includes the identified review identifier, and the block header includes at least a timestamp, a data reference value corresponding to the one or more data values, and a block reference value corresponding to a block most recently added to the blockchain based on the timestamp included in the block header of each of the one or more blocks, wherein a receiver of the processing server further receives one or more verification submissions, wherein each verification submission includes at least a unique reviewer identifier, the review identifier, and verification data indicating positive or negative verification of the review submission; and the processor of the processing server further generates one or more verification blocks, each verification block comprising at least a block header and one or more data values, wherein each of the verification submissions are included in the one or more data values included in one of the one or more verification blocks, and the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block, determines trustworthiness of the review submission by determining that a predetermined number of data values included in the one or more verification blocks indicate a positive verification of the review submission, generates a trustworthiness block, wherein the trustworthiness block includes at least a block header and a trustworthiness data value and the trustworthiness data value includes at least the review identifier and an indication of positive or negative trustworthiness for the review submission based on trustworthiness criteria including if the predetermined number of verification submissions indicate a positive or negative verification of the review submission, respectively, wherein the generated trustworthiness block further identifies to a blockchain network associated with the blockchain the trustworthiness criteria used to determine the trustworthiness of the review submission, determines whether the reviewer identifier identifies a trusted reviewer based on a trusted reviewer criteria including that a number of trustworthiness data values included in the one or more blocks corresponding to a review submission in the one or more blocks that includes the reviewer identifier with a positive verification of the review submission, exceeds a threshold number associated with the trusted reviewer criteria, and generates a trusted reviewer block, wherein the trusted reviewer block includes at least a block header and a trusted reviewer data value and the trusted reviewer data value includes at least the review identifier and an indication of trustworthiness for the review submission submitted by a reviewer associated with the review identifier, wherein the generated trusted reviewer block further identifies to the blockchain network associated with the blockchain, the trusted reviewer criteria used to determine whether the reviewer identifier is a trusted reviewer.

8. The system of claim 7, further comprising:

a transmitter of the processing server, wherein the receiver of the processing server is further configured to receive a score request, wherein the score request includes at least the entity identifier, the processor of the processing server is configured to execute a query on the blockchain to identify a plurality of review submissions included in a plurality of blocks, including the new review block, that includes the entity identifier;

the processor of the processing server is further configured to identify a score associated with the entity corresponding to the entity identifier based on at least the review data included in each of the plurality of review submissions; and the transmitter of the processing server is configured to electronically transmit the identified score in response to the received score request.

9. The system of claim 7, further comprising:
a transmitter of the processing server, wherein
the receiver of the processing server is further configured to receive a score request, wherein the score request includes at least the entity identifier,
the processor of the processing server is configured to execute a query on the blockchain to identify a plurality of review submissions included in a plurality of blocks, including the new review block, that includes the entity identifier;
the processor of the processing server is further configured to
identify a trusted review score associated with the entity corresponding to the entity identifier based on at least the review data included in each of the plurality of review submissions for which there is a corresponding trustworthiness data value included in a trustworthiness block stored in the blockchain, and
identify an untrusted review score associated with the entity corresponding to the entity identifier based on at least the review data included in each of the plurality of review submissions for which there is no corresponding trustworthiness data value included in a trustworthiness block stored in the blockchain; and
the transmitter of the processing server is configured to electronically transmit the identified trusted review score and untrusted review score in response to the received score request.

10. The system of claim 7, further comprising:
a transmitter of the processing server, wherein
the receiver of the processing server is further configured to receive a score request, wherein the score request includes at least the entity identifier,
the processor of the processing server is configured to execute a query on the blockchain to identify a plurality of review submissions included in a plurality of blocks, including the new review block, that includes the entity identifier;
the processor of the processing server is further configured to
identify a trusted reviewer score associated with the entity corresponding to the entity identifier based on at least the review data included in each of the plurality of review submissions that includes a reviewer identifier for which there is a corresponding trusted reviewer data value included in a trusted reviewer block stored in the blockchain, and
identify an untrusted reviewer score associated with the entity corresponding to the entity identifier based on at least the review data included in each of the plurality of review submissions for which there is no corresponding trusted reviewer data value included in a trusted reviewer block stored in the blockchain; and
the transmitter of the processing server is configured to electronically transmit the identified trusted reviewer score and untrusted reviewer score in response to the received score request.

11. The system of claim 7, further comprising:
a transmitter of the processing server configured to electronically transmit the generated new review block to one or more nodes associated with the blockchain for validation.

12. The system of claim 7, wherein generating the new review block includes:
generating, by the processor of the processing server, the block reference value by applying one or more hashing algorithms to the block header included in the most recently added block, and
generating, by the processor of the processing server, the data reference value by applying one or more hashing algorithms to the one or more data values.

13. A non-transitory computer readable recording medium configured to store a program causing a processing device of a processing server to execute a method for immutability of review verifications, the method comprising:
storing, in a memory of a processing server, a blockchain comprised of one or more blocks, wherein each block includes at least a block header and one or more data values, the block header comprising at least a timestamp, a block reference value, and a data reference value;
receiving, by a receiver of the processing server, a review submission, wherein the review submission includes at least a reviewer identifier, entity identifier, and review data comprising feedback associated with an entity corresponding to the entity identifier;
identifying, by a processor of the processing server, a review identifier unique to the received review submission;
generating, by the processor of the processing server, a new review block comprising at least a block header and one or more data values, wherein
the one or more data values includes the review submission,
the review submission further includes the identified review identifier, and
the block header includes at least a timestamp, a data reference value corresponding to the one or more data values, and a block reference value corresponding to a block most recently added to the blockchain based on the timestamp included in the block header of each of the one or more blocks;
receiving, by the receiver of the processing server, one or more verification submissions, wherein each verification submission includes at least a unique reviewer identifier, the review identifier, and verification data indicating positive or negative verification of the review submission;
generating, by the processor of the processing server, one or more verification blocks, each verification block comprising at least a block header and one or more data values, wherein
each of the verification submissions are included in the one or more data values included in one of the one or more verification blocks, and
the block header included in each of the one or more verification blocks includes at least a timestamp, a data reference value corresponding to the one or more data values included in the respective verification block, and a block reference value corresponding to a separate block most recently added to the blockchain based on the timestamp included in the block header of the respective verification block and the timestamp included in the block header of the separate block;
determining, by the processor of the processing server, trustworthiness of the review submission by determining that a predetermined number of data values included in the one or more verification blocks indicate a positive verification of the review submission;

generating, by the processor of the processing server, a trustworthiness block, wherein the trustworthiness block includes at least a block header and a trustworthiness data value and the trustworthiness data value includes at least the review identifier and an indication of positive or negative trustworthiness for the review submission based on trustworthiness criteria including if the predetermined number of verification submissions indicate a positive or negative verification of the review submission, respectively, wherein the generated trustworthiness block further identifies to a blockchain network associated with the blockchain the trustworthiness criteria used to determine the trustworthiness of the review submission;

determining, by the processor of the processing server, whether the reviewer identifier identifies a trusted reviewer based on a trusted reviewer criteria including that a number of trustworthiness data values included in the one or more blocks corresponding to a review submission in the one or more blocks that includes the reviewer identifier with a positive verification of the review submission, exceeds a threshold number associated with the trusted reviewer criteria; and generating, by the processor of the processing server, a trusted reviewer block, wherein the trusted reviewer block includes at least a block header and a trusted reviewer data value and the trusted reviewer data value includes at least the review identifier and an indication of trustworthiness for the review submission submitted by a reviewer associated with the review identifier, wherein the generated trusted reviewer block further identifies to the blockchain network associated with the blockchain the trusted reviewer criteria used to determine whether the reviewer identifier is a trusted reviewer.

14. The non-transitory computer readable recording medium of claim 13, wherein the method further comprises:

receiving, by the receiver of the processing server, a score request, wherein the score request includes at least the entity identifier, executing, by the processor of the processing server, a query on the blockchain to identify a plurality of review submissions included in a plurality of blocks, including the new review block, that includes the entity identifier;

identifying, by the processor of the processing server, a score associated with the entity corresponding to the entity identifier based on at least the review data included in each of the plurality of review submissions; and electronically transmitting, by a transmitter of the processing server, the identified score in response to the received score request.

* * * * *